US009287789B2

(12) United States Patent
Cornell

(10) Patent No.: US 9,287,789 B2
(45) Date of Patent: Mar. 15, 2016

(54) DC-TO-DC CONVERTER INPUT STAGE WITH CAPACITIVE CURRENT LIMIT

(71) Applicant: NATIONAL INSTRUMENTS CORPORATION, Austin, TX (US)

(72) Inventor: Jeffrey A. Cornell, Austin, TX (US)

(73) Assignee: National Instruments Corporation, Austin, TX (US)

( * ) Notice: Subject to any disclaimer, the term of this patent is extended or adjusted under 35 U.S.C. 154(b) by 282 days.

(21) Appl. No.: 13/957,015

(22) Filed: Aug. 1, 2013

(65) Prior Publication Data

US 2015/0035515 A1  Feb. 5, 2015

(51) Int. Cl.
*H02M 3/335* (2006.01)
*H02M 1/32* (2007.01)
*H02M 1/36* (2007.01)

(52) U.S. Cl.
CPC .............. *H02M 3/3353* (2013.01); *H02M 1/32* (2013.01); *H02M 1/36* (2013.01)

(58) Field of Classification Search
CPC ....... H02M 3/3353; H02M 1/32; H02M 1/36; G05F 1/32; G05F 1/34
USPC ........ 363/16, 17, 20, 21.01, 97, 98, 131, 132; 323/355, 358, 359, 363
See application file for complete search history.

(56) References Cited

U.S. PATENT DOCUMENTS

| | | | |
|---|---|---|---|
| 5,657,212 A * | 8/1997 | Poon et al. | 363/17 |
| 5,815,381 A | 9/1998 | Newlin | |
| 6,021,053 A * | 2/2000 | Baskette et al. | 363/40 |
| 7,646,116 B2 | 1/2010 | Batarseh et al. | |
| 7,688,045 B2 | 3/2010 | Wang | |
| 8,143,856 B2 | 3/2012 | Andrea et al. | |
| 8,212,536 B2 | 7/2012 | Burns et al. | |
| 8,355,265 B2 | 1/2013 | Gengenbach | |
| 2004/0246089 A1 | 12/2004 | Stephens | |
| 2010/0128498 A1 | 5/2010 | Nymand | |
| 2010/0284204 A1 * | 11/2010 | Mayell | 363/37 |
| 2012/0299551 A1 * | 11/2012 | Xu et al. | 320/129 |
| 2014/0098569 A1 * | 4/2014 | Kohler et al. | 363/15 |

\* cited by examiner

*Primary Examiner* — Matthew Nguyen
(74) *Attorney, Agent, or Firm* — Meyertons Hood Kivlin Kowert & Goetzel, P.C.; Jeffrey C. Hood

(57) ABSTRACT

A power converter may have an input stage that includes a pair of transformer coils, switching circuitry to energize the pair of transformer coils according to an input supply voltage provided by an input source, and a limiting circuit coupled between the pair of transformer coils to cause the input stage to stop drawing current from the input source once the amount of charge drawn from the input source reaches a specific value. An output stage of the power converter may receive energy from the pair of transformer coils, and convert the received energy into an output supply voltage. The pair of transformer coils may continue providing energy stored in a leakage inductance of the pair of transformer coils to the output stage for at least a period of time, once the limiting circuit has caused the input stage to stop drawing current from the input supply.

20 Claims, 4 Drawing Sheets

DC-TO-DC CONVERTER INPUT STAGE WITH CAPACITIVE CURRENT LIMIT

BACKGROUND OF THE INVENTION

1. Field of the Invention

This invention relates generally to voltage/power converters, and more particularly, to an improved DC-to-DC converter input stage.

2. Description of the Related Art

A DC-to-DC converter is an electronic circuit, which converts a source of direct current (DC) from one voltage level to another, and is considered a class of power converter. Most DC-to-DC converters also regulate the output voltage. There are various different types of DC-to-DC converters/regulators, including linear regulators, electronic switch-mode converters, magnetic converters, and switched capacitor converters, among others. Linear regulators are used to downconvert higher input voltages to lower output voltages. Magnetic DC-to-DC converters periodically store and release energy in and from a magnetic field in an inductor or a transformer. Electronic switch-mode DC-to-DC converters convert one DC voltage level to another by temporarily storing the input energy, then releasing the stored energy to the output at a different voltage level. Switched capacitor converters operate by alternately connecting different capacitor topologies between the input and output. Voltage conversion is also performed by switching voltage regulators, which incorporate a switching mechanism to efficiently convert electrical power. Unlike linear power supplies, the pass transistor of switching voltage supplies continually switches between low-dissipation, full-on and full-off states, residing in a high dissipation state for only very brief periods of time, thereby minimizing energy loss. Switching voltage regulators often use two or more power transistors to convert energy at one voltage to another voltage.

In DC-to-DC converters, it is typically necessary to limit the amount of power provided in order to avoid surges during startup, and/or avoid damaging any circuit component during a fault condition. In some applications, the output of a power converter may be expected to supply brief, large surges of power, and it may be desirable to draw this power from the energy stored in the output capacitor rather than from the input power supply that provides the input voltage to the converter. This may also be achieved by limiting the amount of power delivered by the input. There are a number of existing solutions to this problem, each with its own drawbacks.

The current drawn from the input can be measured, and the converter can actively respond to regulate this current down to a certain maximum value. This typically requires an active control loop, which adds considerable design complexity, and has to be stabilized during normal operation. The current measurement is typically performed through the use of a series resistor, which can waste power even when the current limit is not reached. A series output resistance can be simulated with a series reactance that has an impedance related to the switching frequency of the converter. This limits the power provided by the converter without unduly hurting efficiency, but prevents the output from approximating a constant voltage source even when the power limit is not reached, and an approximately constant voltage output is an extremely desirable, common characteristic of DC-to-DC converters.

The direct draw of brief power surges from the input power supply can be prevented, by using sufficient filtering. Persistent fault conditions can be detected, and the converter can shut down in response. In addition, startup surges can be reduced, by altering the converter's behavior only during startup. However, the necessary filtering tends to require large inductors that are unacceptable in space-constrained applications. Shutting down the converter during a fault condition requires an explicit fault detection and reset mechanism. Similarly, a distinct start-up behavior requires the ability to detect that the converter is in a start-up condition, and respond appropriately, all of which add a considerable amount of design complexity.

Other corresponding issues related to the prior art will become apparent to one skilled in the art after comparing such prior art with the present invention as described herein.

SUMMARY OF THE INVENTION

A novel DC-to-DC converter may limit the amount of current drawn from the input supply in a way that does not require active regulation, does not interfere with a constant-voltage output when the current limit is not reached, does not waste power when the current limit is not reached, does not introduce much design complexity, and does not require large, additional components. For example, various embodiments may be implemented without a transformer. While transformers may be large, they are typically already present in many DC-to-DC converters that provide an isolated or 'floating' output. Various embodiments may not necessitate active regulation to impose any given power limit. However, the value of the power limit may be varied with a control signal if desired.

Thus, in one set of embodiment, the input stage of a power converter—operated to transfer energy to an output stage of the power converter—may include an input for coupling to a supply source that provides an input voltage, and may further include a pair of transformer coils instead of a single transformer coil. The two transformer coils may be closely matched and each coil may represent one-half of an equivalent single coil. The input stage may further include switching circuitry for energizing the pair of transformer coils. In order to energize the pair of transformer coils, the switching circuitry may be operated to apply an input signal to the pair of transformer coils according to the input voltage. Under normal operating conditions, energy is transferred from the pair of transformer coils to an output stage of the power amplifier through the changing of states of the switches in the switching circuitry. The state of the switches may be changed back and forth between two different states at a specified frequency.

The input stage may also include a limiting circuit coupled between the pair of transformer coils, and may cause the converter input stage to stop drawing energy from the supply source once the amount of charge drawn from the supply source reaches a specific value, e.g. a maximum threshold value. The stored energy in a leakage inductance of the pair of transformer coils may continue to provide power (or energy) to the output stage for at least a specific period of time following the limiting circuit having caused the input stage to stop drawing energy from the supply source. If all the stored energy in the leakage inductance is transferred to the output stage before a switching state of the switching circuitry changes, a total energy delivered to the output stage corresponds to a current limit of the input stage. If energy is still stored in the pair of transformer coils at a point in time when a switching state of the switching circuitry changes after the limiting circuit has caused the input stage to stop drawing energy from the supply source, the input stage may return a portion of the energy stored in the pair of transformer coils to the supply source rather than providing that portion of the energy to the output stage.

In one embodiment, the limiting circuit includes a capacitor with a first end coupled to a terminal of one of the transformer coils, and a second end coupled to a terminal of the other transformer coil. A diode network coupled to the first end and the second end of the capacitor may operate to clamp a ripple voltage developed across the capacitor when the amount of charge drawn from the voltage supply reaches the specific value, causing the input stage to stop drawing energy from the supply source. A maximum average current drawn from the supply source by the input stage may therefore be determined by a value of the input voltage, a value of the capacitor, and a frequency at which the switching circuitry is operated to change back and forth between the two switching states. In some embodiments, the input signal applied to the transformer coils may be a square wave signal, with the pair of transformer coils generating an output square wave signal corresponding to the square wave signal. The output square wave signal may be used by the output stage to generate the output supply voltage. It should be noted that while an output square wave may be used in some of the most common output configurations, the use of output square waves is not necessary, and alternate embodiments featuring other output stages may use other output signal/waveforms as desired.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
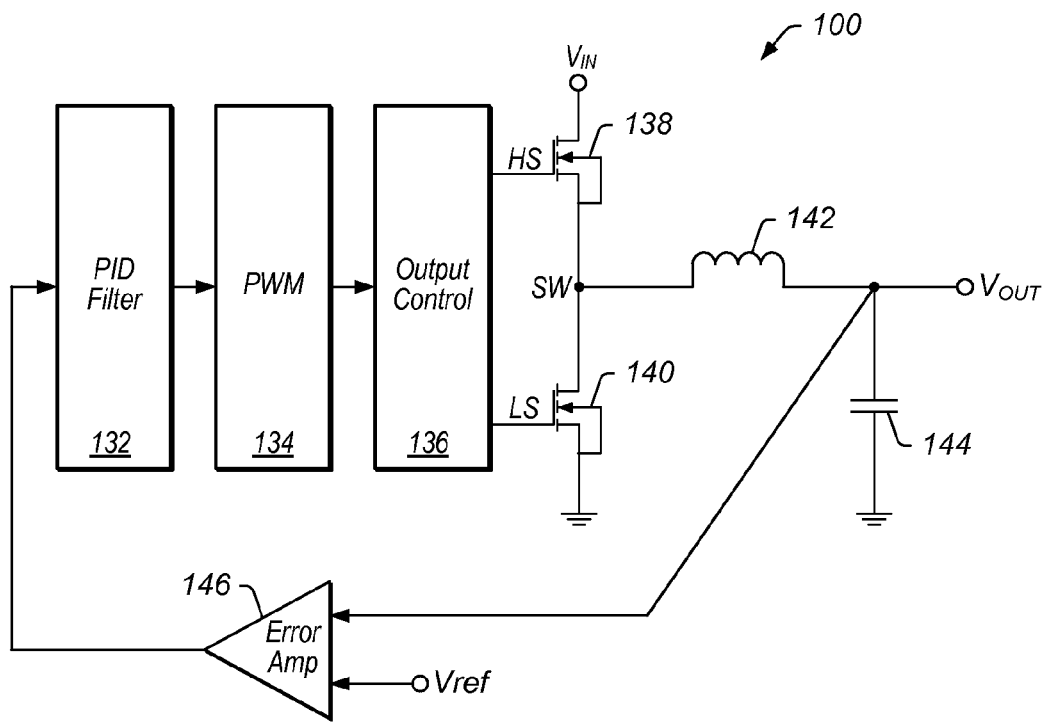
FIG. 1 shows a partial circuit diagram of one embodiment of a prior art switching power regulator.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE EMBODIMENTS

One common example of a prior art switching power regulator 100, commonly called a "Buck Regulator" is shown in FIG. 1. Buck Regulator 100 typically switches a pair of power transistors (108 and 110) in order to produce a square-wave at the transistors' common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$. As previously mentioned, the active control loop adds considerable design complexity with the inclusion of PID 132, PWM 134, and Output Control Circuit 136. In addition, the control loop is required to be stabilized during normal operation.

Figure 2:
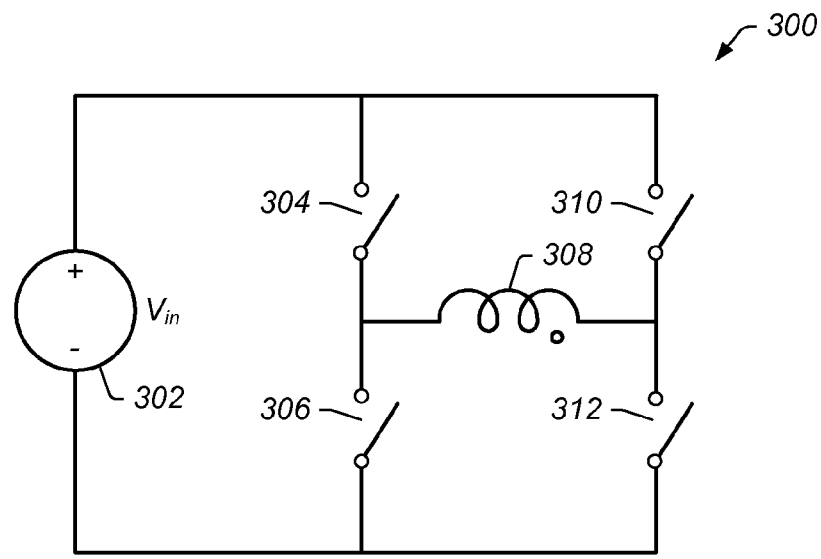
FIG. 2 shows a partial circuit diagram of one embodiment of a prior art H-bridge structure for an input stage of a power converter.

Another type of switching DC-to-DC power converter (or voltage converter) uses a transformer coil in a standard H-Bridge structure. One example of such an H-Bridge structure is shown in FIG. 2. The coil 308 in the center represents the input coil of a transformer. The four switches 304, 306, 310, 312 are alternately opened and closed in pairs to apply a square wave input signal to coil 308 according to the input voltage $V_{in}$ provided by supply 302. This operation transfers energy to one or more output coils as an output square-wave corresponding to the square wave applied to coil 308, and the output square wave is then turned back into a DC output supply by any one of a number of possible methods. The selection of a specific conversion method at the output is not relevant to the various embodiments proposed herein, therefore the output coil(s) and conversion mechanism back to DC are omitted in the disclosed figures for simplicity. Various embodiments disclosed herein may be best understood as a variation/improvement of the H-Bridge circuit 300 shown in FIG. 2.

Figure 3:
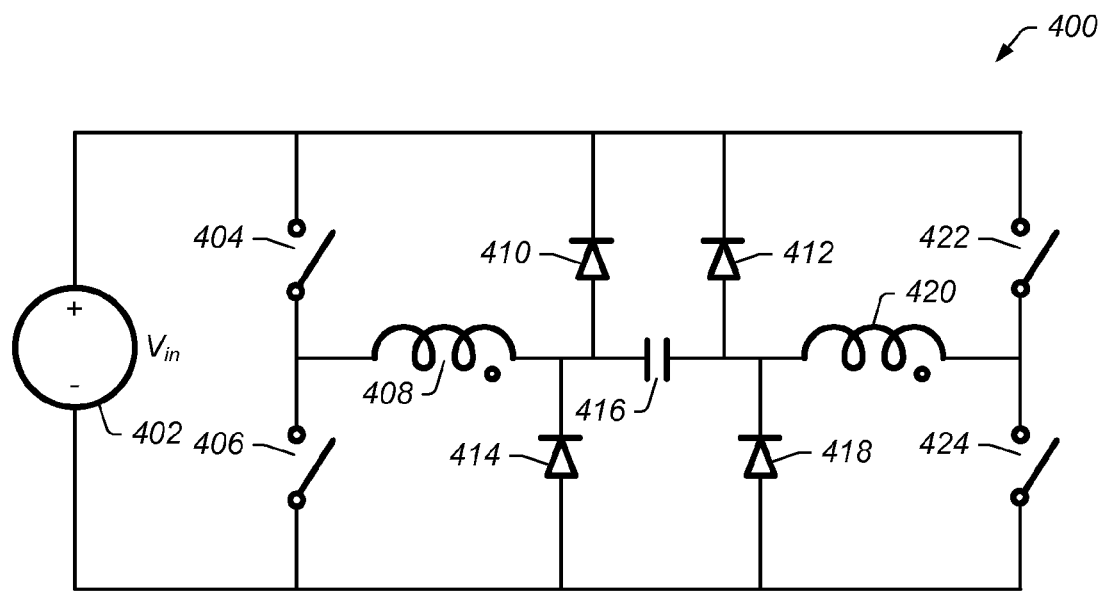
FIG. 3 shows the partial circuit diagram of one embodiment of novel H-bridge structure for an input stage of a power converter.

An improved converter input stage is shown in FIG. 3. In one set of embodiments, the improved converter input stage 400 may resemble the standard H-Bridge structure (e.g. H-bridge structure 300) with the transformer input coil 300 split into two coils 408 and 420, with additional circuitry/components 410, 412, 414, 416, and 418 configured between them. These components may be considered to form a "limiting circuit", which—in the embodiments shown in FIG. 3—includes diodes 410, 412, 414, and 418, and capacitor 416. The two input coils 408/420 may be designed to match each other as closely as possible, each corresponding to half of the equivalent single coil 308 used in the standard H-Bridge 300. Input stage 400 may be combined with an output stage selected from a number of applicable output stages for transformer-based converters. Such output stages are well known to one of ordinary skill in the art, and are not disclosed herein for the sake of simplicity, since they do not affect the operating principles of the various embodiments of the converter input stage described herein. Transformer coils 408 and 420 may represent the input (primary) windings of the transformer, while the output stage may include the secondary windings of the transformer. Accordingly, various different output stages may be combined with input stage 400 to obtain a desired transformer-based converter.

During normal operation, improved converter input stage 400 may operate in a manner similar to the operation of standard H-Bridge 300, with the exception that a ripple voltage may be developed across capacitor 416 in the center. Depending on the choice of output stage, this ripple voltage has the potential to create a simulated output resistance. However, this may be avoided regardless of the output configuration (that is, regardless of what output structure is coupled to the input stage 400) through the use of an inductance in series with transformer coils 408/420. A series inductor may resonate with the capacitor 416, which results in no output impedance (i.e. it results in an output impedance of zero) as long as the switching frequency of the circuit is lower than the resonant frequency. However, one of the non-ideal characteristics of transformers is leakage inductance, which is a series inductance, which may be sufficient in most designs without requiring additional series inductance, that is, without requiring an additional inductor component in series with transformer coils 408/420. Various embodiments of improved converter input stages described herein may encompass all variations in series inductance value and output configuration, as well as any other components in series with the transformer coils 408/420, as none of these variations affect the fundamental operation of the various embodiments of the current limiting feature described herein.

The amplitude of the ripple voltage across capacitor 416 is dependent on how much average current is drawn from input supply 402 and passed through the coils 408/420. If the average current drawn from the input supply 402 and flowing in coils 408/420 is high enough, (or, in other words, if the amount of charge drawn from input supply 402 has reached a certain value), the ripple voltage across capacitor 416 eventually becomes clamped by diodes 410, 412, 414 and 418, and the circuit may enter a 'freewheeling state' in which any energy stored in the leakage inductance continues to power the output, but no additional energy is drawn from the input supply 402. This condition may persist until switches 404, 406, 422 and 424 change states, and begin charging capacitor 416 in the opposite direction. The diode clamps (i.e. diodes 410, 412, 414 and 418) constrain the voltage on each side of capacitor 416 to be between the high and low potentials of the input supply voltage provided by supply 402. Accordingly, without changing the respective states of switches 404, 406, 422 and 424, the highest voltage swing across capacitor 416 is limited to double the input voltage provided by supply 402, as the voltage at one side (or first terminal) of capacitor 416 swings from low to high, and the voltage at the other side (or second terminal) of capacitor 416 swings from high to low.

Any given voltage change across capacitor 416 corresponds to a certain amount of electrical charge passed through capacitor 416. When switches 404, 406, 422 and 424 are operated to change states at regular intervals, and there is a maximum amount of charge passed through capacitor 416 (and thus a maximum amount of charge drawn from input voltage supply 402) within each interval, there is a maximum amount of charge drawn by the end of any given time interval. That is, the average current during the full switching interval may be limited, which generalizes to the average current over any number of switching intervals being limited, while the current during a sub-interval of a switching interval has no particular limit. This establishes a maximum possible average current during that interval. Therefore, the maximum average current drawn from input supply 402 may be set by the value of the input voltage, the value of the capacitor 416, and the frequency at which switches 404, 406, 422 and 424 change states.

Once capacitor 416 has been clamped, and the circuit enters the freewheeling state, the leakage inductance continues to transfer its stored energy to the output. If all of this energy is transferred before switches 404, 406, 422 and 424 change states, then the total energy delivered corresponds to the current limit. However, under very heavy loads, such as during start-up or a fault condition, the inductors 408/420 may still be storing some energy when switches 404, 406, 422 and 424 change states. In this case, the circuit enters a third state in which some of the inductor energy is returned to input supply 402 rather than being transferred to the output. This reverse current decreases the average current, thus the current becomes increasingly limited for very heavy loads. For a fault condition caused by a true short-circuit at the output, this effect may result in the circuit ceasing to supply any significant amount of power to the output, without the need to explicitly detect a fault.

It should be noted that while the switches are in a particular state, the limiting circuit may cause the input stage to stop drawing energy from the supply once the total amount of electrical charge drawn from the supply reaches a certain value. Because this limiting process is repeated each time the switches change states, and the switches change states at regular time intervals, the result is a limit on the total charge drawn per time interval. Since electrical current is defined as amount of charge drawn per unit of time, this establishes a maximum average current during the full time interval in which the switches are in a particular state, while the instantaneous value of the current at a particular moment within that interval may exceed that limit. For example, if the switches change states once per microsecond (µsec), and the limiting circuit sets a maximum of 1 micro-Coulomb (µC) of charge drawn during each interval, the maximum average current drawn is 1 µC/µsec, or 1 Ampere (A) of current. However, within a single µsec switching interval, this may occur by drawing 2 A for half a µsec, at which point the limiting circuit turns on and causes the input stage to draw 0 A for the remaining half µsec, resulting in an average of 1 A of current.

Figure 4:
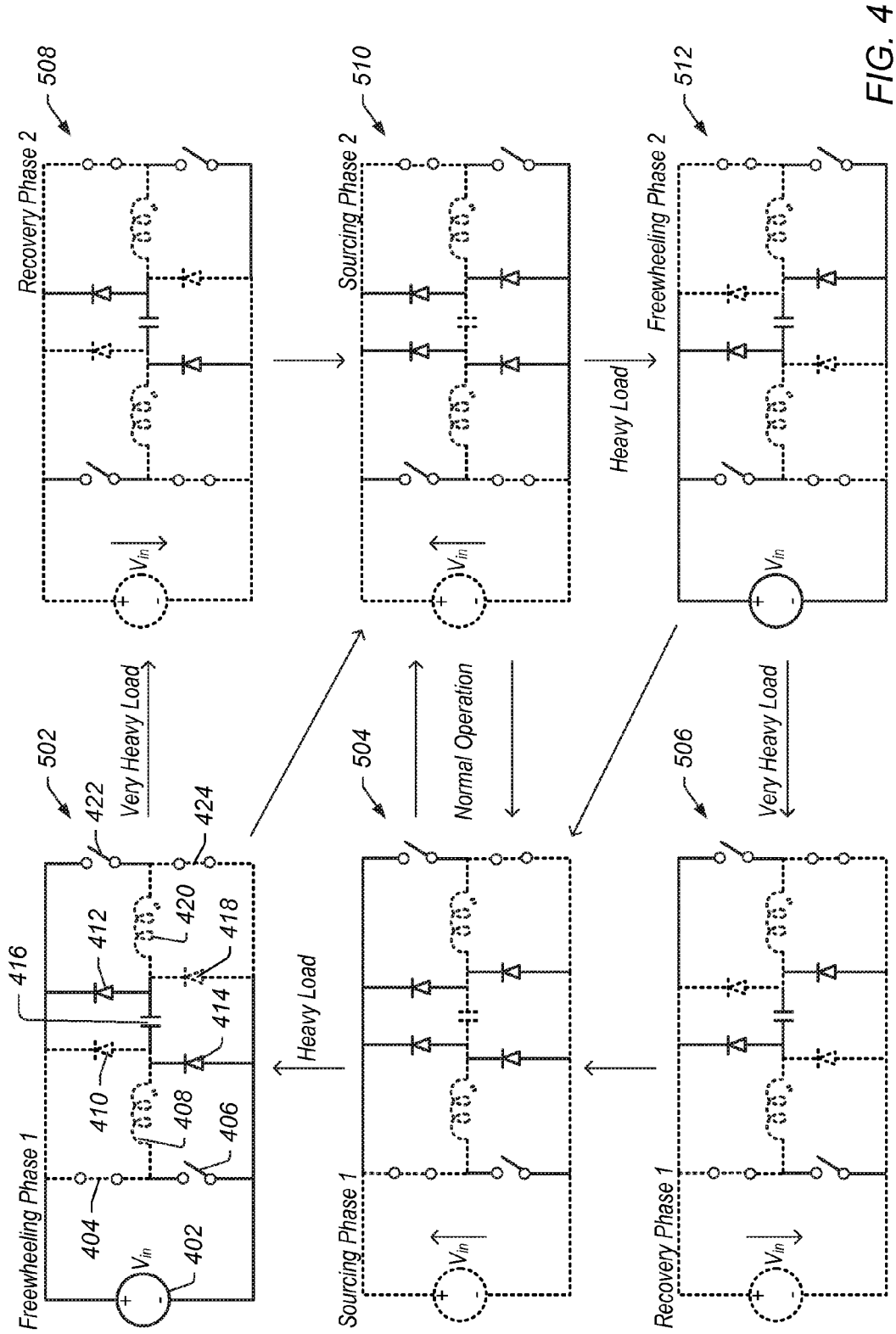
FIG. 4 shows the different operating phases of the novel H-bridge structure of FIG. 3.

The set of transitions between various states, or operating phases of converter input stage 400 and the conditions that cause them are outlined in FIG. 4. Each instance (502, 504, 506, 508, 510 and 512) of the converter input stage in FIG. 4 illustrates an operating phase of converter input stage 400 from FIG. 3. While the numbers identifying various components have been omitted in all but operating phase 502 in FIG. 4 for the sake of simplicity, the various components shown in each instance (of the converter input stage for respective operating phases 502, 504, 506, 508, 510 and 512) are identical to the components of converter input stage 400. The dashed lines in the respective instance associated with a respective operating phase of operating phases 502, 504, 506, 508, 510 and 512 indicates where current is flowing in the input converter stage 400 during the respective operating phase.

In the sourcing phases, power is drawn from input supply 402 until either the switches 404, 406, 422 and 424 change states, or the voltage across capacitor 416 turns on a pair of diodes (from diodes 410, 412, 414 and 418) and sends the circuit into a freewheeling phase. For example, as shown in FIG. 4, during normal operation, converter input stage may be operating in phase 504, drawing power from input supply 402 in the direction indicated by the arrow next to supply 402, with switches 404 and 424 closed and switches 406 and 422 open. When operating in phase 504, if the state of the switches is adjusted such that switches 404 and 424 are opened and switches 406 and 422 are closed, converter input stage 400 continues to draw current from input supply 402, but the current is now drawn while converter input stage 400 is operating in phase 510. When operating in phase 504, if the voltage across capacitor 416 reaches a sufficiently high value, diodes 410 and 418 are turned on, and converter input stage 400 enters freewheeling phase 502. Similarly, when operating in phase 510, if the voltage across capacitor 416 reaches a sufficiently high value, diodes 412 and 414 are turned on, and converter input stage 400 enters freewheeling phase 512.

In the freewheeling phases, no current is drawn from input supply 402, and the leakage inductance transfers its stored energy to the output until either all the energy is spent, or the switches change states while the inductance still has some energy and the circuit enters a recovery phase. For example, referring again to FIG. 4, during normal operation, converter input stage may be operating in phase 504, and the application of a heavy load may result in the voltage across capacitor 416 turning on diodes 410 and 418, causing the converter to enter freewheeling operating phase 502. As seen in FIG. 4, no current is drawn from supply 402, and when switches 404 and 424 are turned off and switches 406 and 422 are turned on after all the stored energy has been transferred to the output, the converter enters sourcing phase 510. However, when switches 404 and 424 are turned off and switches 406 and 422 are turned on before all the stored energy has been transferred to the output, the converter enters recovery phase 508.

Similarly, during normal operation, converter input stage may be operating in phase 510, and the application of a heavy load may result in the voltage across capacitor 416 turning on diodes 414 and 412, causing the converter to enter freewheeling operating phase 512. No current is drawn from supply 402, and when switches 406 and 422 are turned off and switches 404 and 424 are turned on after all the stored energy has been transferred to the output, the converter enters sourcing phase 504. However, when switches 406 and 422 are turned off and switches 404 and 424 are turned on before all the stored energy has been transferred to the output, the converter enters recovery phase 506.

In the recovery phases, the leakage inductance continues to transfer energy to the output while also returning energy to the input supply, decreasing the average current. This continues until all the inductor energy has been exhausted, at which point the input voltage begins forcing current in the opposite direction, returning the circuit into a sourcing phase. For example, when operating in recovery phase 508, current is seen flowing into the positive terminal of supply 402, a direction opposite to the current flow indicated in sourcing phases 504 and 510. Once the energy in inductors 408 and 420 has been used up, supply 402 begins forcing current in the opposite direction, returning the circuit into sourcing phase 510. Similarly, when operating in recovery phase 506, current is seen flowing into the positive terminal of supply 402, and once the energy in inductors 408 and 420 has been used up, supply 402 begins forcing current in the opposite direction, returning the circuit into sourcing phase 504. As also illustrated in FIG. 4, the converter may enter the sourcing phase from the recovery phase without any adjustment to the then current position of switches 404, 406, 422 and 424.

Given input voltage $V_{in}$, capacitance C, and switching frequency f at which switches 404, 406, 422 and 424 are operated, the maximum average current drawn from input supply 402 may be given by equation:

$$I_{max\_average} = 4 * V_{in} * C * f. \quad (1)$$

The dependence on C means that if certain design considerations lead to the selection of a particular switching frequency, an appropriate value of C may be determined to still obtain the desired current limit. The dependence on f means that for a given value of C, the current limit may be programmatically varied by changing the switching frequency.

Figure 5:
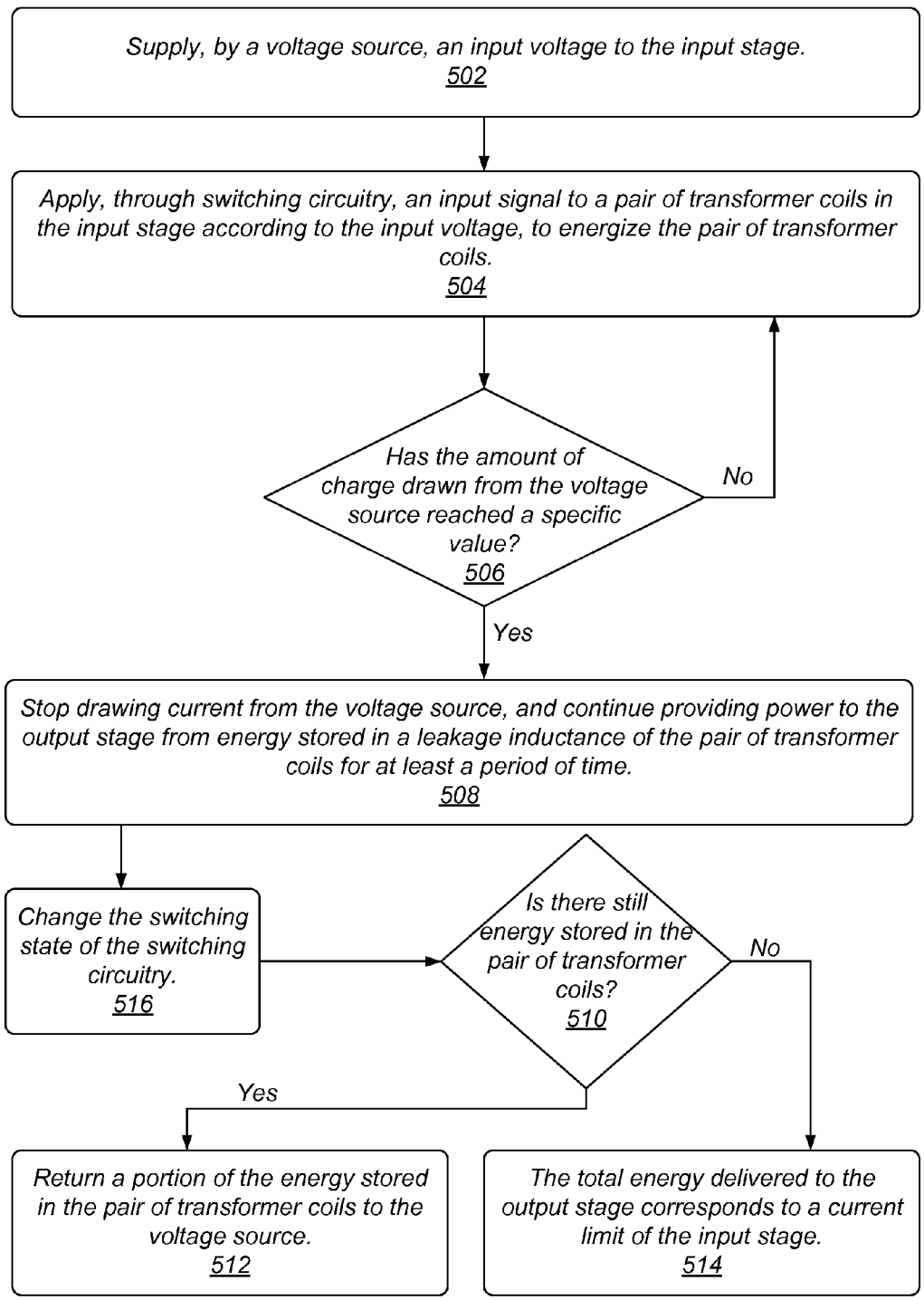
FIG. 5 shows a flow diagram of one embodiment of a method for transferring energy from an input stage of a power converter to an output stage of the power converter.

FIG. 5 shows a flow diagram of one embodiment of a method for transferring energy from an input stage to an output stage in a power converter, based on the structure of converter input stage 400 and the operating phases of input stage 400 illustrated in FIG. 4. As illustrated in FIG. 5, an input voltage is supplied by a voltage source to the input stage (502), and an input signal is applied, through switching circuitry, to a pair of transformer coils in the input stage according to the input voltage, to energize the pair of transformer coils (504). Responsive to the amount of charge drawn from the voltage source reaching a specific value ('Yes' branch from 506), current draw from the voltage source is stopped, while power is still provided to the output stage for at least a period of time from energy stored in a leakage inductance of the pair of transformer coils (508). If the amount of charge drawn from the voltage source has not reached the specified value ('No' branch from 506), the transformer coils are energized according to normal operation (504). If, subsequent to 508, the switching state of the switching circuitry is changed (516) when there is no longer any energy stored in the pair of transformer coils, that is, all the energy stored in the leakage inductance has been transferred to the output stage ('No' branch from 510), the total energy delivered to the output stage corresponds to a current limit of the input stage (514). If the switching state of the switching circuitry is changed (516) when there is still energy left in the pair of transformer coils ('Yes' branch from 510), a portion of the energy stored in the pair of transformer coils is returned to the voltage source (512). As long as the amount of charge drawn from the voltage source does not reach the specified value, energy may simply be transferred from the pair of transformer coils to the output stage according to the operation of the switching circuitry and the input supply voltage. In reference to FIG. 4, the 'No' branch from 510 corresponds to the input stage entering a "sourcing phase" from a "freewheeling phase", while the 'Yes' branch from 510 corresponds to the input stage entering a "recovery phase" from a "freewheeling phase". Similarly, the 'No' branch from 506 corresponds to the input stage entering a "sourcing phase" from the other "sourcing phase" (e.g. entering sourcing phase 510 from sourcing phase 504, or vice versa), while the 'Yes' branch from 506 corresponds to the input stage entering a "freewheeling phase" from a "sourcing phase".

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A converter input stage for transferring energy to an output stage:
   an input configured to couple to a supply source providing an input voltage;
   a pair of transformer coils;
   switching circuitry configured to energize the pair of transformer coils, wherein in energizing the pair of transformer coils, the switching circuitry is configured to apply an input signal to the pair of transformer coils according to the input voltage; and
   a limiting circuit coupled between the pair of transformer coils, and configured to cause the converter input stage to stop drawing energy from the supply source once an amount of charge drawn from the supply source reaches a specific value;
   wherein stored energy in a leakage inductance of the pair of transformer coils continues to provide power to the output stage for at least a period of time, once the limiting circuit has caused the converter input stage to stop drawing energy from the supply source.

2. The converter input stage of claim 1, wherein if all the stored energy in the leakage inductance is transferred to the output stage before a switching state of the switching circuitry changes, a total energy delivered to the output stage corresponds to a current limit of the converter input stage.

3. The converter input stage of claim 1, wherein if energy is still stored in the pair of transformer coils at a point in time when a switching state of the switching circuitry changes after the limiting circuit has caused the converter input stage to stop drawing energy from the supply source, the converter input stage is configured to return a portion of energy stored in the pair of transformer coils to the supply source rather than to the output stage.

4. The converter input stage of claim 1, wherein the pair of transformer coils comprises two matching coils, wherein each coil of the two matching coils corresponds to one-half of an equivalent single coil.

5. The converter input stage of claim 1, wherein the limiting circuit comprises:
a capacitor having a first end coupled to a terminal of a first one of the pair of transformer coils, and further having a second end coupled to a terminal of a second one of the pair of transformer coils; and
a diode network coupled to the first end and the second end of the capacitor, and configured to clamp a ripple voltage developed across the capacitor when the amount of charge drawn from the supply source reaches the specific value, causing the converter input stage to stop drawing energy from the supply source.

6. The converter input stage of claim 5, wherein a maximum average current drawn from the supply source by the converter input stage is determined by a value of the input voltage, a value of the capacitor, and a frequency at which switches within the switching circuitry change states.

7. The converter input stage of claim 1, wherein the input signal comprises a square wave signal.

8. The converter input stage of claim 7, wherein the pair of transformer coils are configured to generate an output square wave signal corresponding to the square wave signal, wherein the output square wave signal is usable by the output stage to generate an output supply voltage.

9. The converter input stage of claim 1, wherein the input voltage is a direct current input voltage.

10. A method for transferring energy from an input stage to an output stage in a power converter, the method comprising:
supplying, by a voltage source, an input voltage to the input stage;
energizing a pair of transformer coils in the input stage, comprising applying, through switching circuitry, an input signal to the pair of transformer coils according to the input voltage;
stopping drawing current from the voltage source, responsive to an amount of charge drawn from the voltage source reaching a specific value; and
continuing to provide power to the output stage from energy stored in a leakage inductance of the pair of transformer coils for at least a period of time subsequent to said stopping drawing current from the voltage source.

11. The method of claim 10, wherein said continuing to provide power to the output stage comprises:
transferring all the energy stored in the leakage inductance to the output stage, before changing a switching state of the switching circuitry;
wherein a total energy delivered to the output stage responsive to said transferring corresponds to a current limit of the input stage.

12. The method of claim 10, further comprising:
changing a switching state of the switching circuitry at a point in time subsequent to said stopping drawing current when energy is still stored in the pair of transformer coils; and
returning a portion of energy stored in the pair of transformer coils to the voltage source, responsive to said changing.

13. The method of claim 10, wherein the pair of transformer coils comprise two matching coils, wherein each coil of the two matching coils corresponds to one-half of an equivalent single coil.

14. The method of claim 10, further comprising setting a maximum average value for the current drawn from the voltage source, said setting comprising:
specifying a value of the input voltage;
specifying a value of a capacitor coupled between the pair of transformer coils; and
specifying a frequency at which switches within the switching circuitry are instructed to change states.

15. The method of claim 10, wherein said applying the input signal comprises applying a square wave signal.

16. The method of claim 15, further comprising:
generating, by the pair of transformer coils, an output square wave signal corresponding to the square wave signal, responsive to said applying the square wave signal.

17. The method of claim 16, further comprising:
generating an output supply voltage, by the output stage, based on the output square wave signal.

18. A power converter comprising:
an input stage comprising:
a pair of transformer coils;
switching circuitry configured to energize the pair of transformer coils according to an input supply voltage provided by an input source; and
a limiting circuit coupled between the pair of transformer coils, and configured to cause the input stage to stop drawing current from the input source once an amount of charge drawn from the input source reaches a specific value; and
an output stage configured to receive energy from the pair of transformer coils, and convert the received energy into an output supply voltage;
wherein the pair of transformer coils are configured to continue providing energy stored in a leakage inductance of the pair of transformer coils to the output stage for at least a period of time, once the limiting circuit has caused the input stage to stop drawing current from the input supply.

19. The converter of claim 18, wherein if all the stored energy in the leakage inductance is transferred to the output stage before a switching state of the switching circuitry changes, a total energy delivered to the output stage corresponds to a current limit of the converter input stage.

20. The converter input stage of claim 18, wherein if energy is still stored in the pair of transformer coils at a point in time when a switching state of the switching circuitry changes after the limiting circuit has caused the input stage to stop drawing energy from the input supply, the pair of transformer coils are configured to return a portion of energy stored in the pair of transformer coils to the input supply.

* * * * *